United States Patent [19]

Peterson et al.

[11] Patent Number: 5,273,249

[45] Date of Patent: Dec. 28, 1993

[54] SLIDE JOINT BRACKET

[75] Inventors: Ivan H. Peterson, Hamilton; Steven A. Walters, Cincinnati; Dale E. Hampshire, Mason, all of Ohio

[73] Assignee: General Electric Company, Cincinnati, Ohio

[21] Appl. No.: 974,637

[22] Filed: Nov. 12, 1992

[51] Int. Cl.⁵ .............................................. F16M 13/00
[52] U.S. Cl. ................................. 248/550; 60/39.32; 60/739; 248/901; 403/110
[58] Field of Search ............ 248/550, 901, 638, 295.1; 403/71, 110, 388; 60/739, 39.31, 39.32

[56] References Cited

U.S. PATENT DOCUMENTS

| | | | |
|---|---|---|---|
| 3,027,715 | 4/1962 | Morris | 60/39.32 |
| 3,455,527 | 7/1969 | Suozzo | 248/550 |
| 3,670,497 | 6/1972 | Sheldon | 60/39.32 |
| 3,756,020 | 9/1973 | Maskowitz et al. | 60/39.31 X |
| 3,775,975 | 12/1973 | Stenger et al. | 60/39.32 |
| 3,793,838 | 2/1974 | Nash | 60/261 |
| 4,907,743 | 3/1990 | Bouiller et al. | 60/39.32 X |

*Primary Examiner*—Ramon O. Ramirez
*Attorney, Agent, or Firm*—Jerome C. Squillaro; John R. Rafter

[57] ABSTRACT

A support system for coupling elements of different temperatures while reducing thermal and dynamic stress. The support system couples a fuel manifold to a combustor in a gas turbine engine and includes first and second elongated brackets connected, respectively, to the combustor and to the fuel manifold. Distal ends of each of the brackets are positioned in overlapping relationship. A slot is formed in one of the overlapping distal ends and an aperture formed in the other aligned generally with the slot. A fastener extends through the aperture and slot compressing the ends against each other with a preselected force such that the ends cannot separate but can exhibit a sliding motion in the slot direction. The compressive force is controlled by a spring member positioned between one end of the fastener and an adjacent surface of one of the first and second brackets. A second disk fits around the stud similar to a large flat washer and the spring member fits around the stud between the two disks. A nut on the opposite end of the stud and the opposite side of the bracket ends is tightened to compress the spring member and establish the preselected compressive force on the bracket ends. The abutting surface of the bracket ends may be treated to reduce wear.

14 Claims, 3 Drawing Sheets

SLIDE JOINT BRACKET

BACKGROUND OF THE INVENTION

The present invention relates to gas turbine engines and, more particularly, to an apparatus for supporting a relatively cool member such as a fuel manifold to a relatively hot member such as a combustor housing in a manner to accommodate differential thermal growth and retain dynamic stability.

Conventional gas turbine engines for aircraft propulsion are axial flow engines having a forward compressor section, a mid-engine, combustor section and an aft turbine section. Centrally located shafts extend through the engine coupling the turbine section to the combustor section. The rotation of the elements in the compressor and turbine sections combined with the combustion and gas flow through the engine results in some degree of vibration throughout the engine. Various auxiliary components are supported on housings or other structural members associated with the enumerated engine sections. The supports or mounts for these auxiliary components desirably accommodate the engine vibrations.

In some areas of the engine generally beginning with the combustor section and extending aft, there exists a significant temperature differential between the auxiliary components and the adjacent engine section. For example, the fuel lines or fuel manifold adjacent the combustor carry relatively cool fuel and are at a substantially lower temperature than the adjacent combustor section. The fuel manifold is supported on brackets extending from the combustor. The temperature differential between the combustor and the manifold results in a significant differential growth which places a stress on the fuel manifold. The combination of this stress along with the aforementioned vibration may result in the development of cracks in the manifold from both low and high cycle fatigue. Accordingly, it is desirable to provide a method for coupling elements of different temperatures in a manner to minimize low cycle fatigue.

This can be accomplished using split brackets with overlapping ends and spring loading to accommodate thermal expansion. However, it has been found that without additional structure, such spring loaded joints tend to bind and inhibit the function they are intended to perform. Accordingly, it is desirable to provide a coupling method which overcomes the binding characteristic of a simple spring loaded slide bracket.

SUMMARY OF THE INVENTION

The present invention comprises a support system for coupling elements of different temperatures while reducing thermal and dynamic stress. In an illustrative form, the support system couples a fuel manifold to a combustor in a gas turbine engine and includes first and second elongated brackets connected, respectively, to the combustor and to the fuel manifold. Distal ends of each of the brackets are positioned in overlapping relationship. A slot is formed in one of the overlapping distal ends and an aperture formed in the other aligned generally with the slot. A fastener extends through the aperture and slot compressing the ends against each other with a preselected force such that the ends cannot separate but can exhibit a sliding notion in the slot direction. The compressive force is controlled by a spring member positioned between one end of the fastener and an adjacent surface of one of the first and second brackets.

In one form, the fastener is a threaded stud having a head end swaged into an annular disk. A second disk fits around the stud similar to a large flat washer and the spring member fits around the stud between the two disks. A nut on the opposite end of the stud and the opposite side of the bracket ends is tightened to compress the spring member and establish the preselected compressive force on the bracket ends. In another form, a sleeve extends between the annular disk and an upper bracket to establish a preselected spacing between these elements. This spacing compresses the spring member to the preselected force. The abutting surface of the bracket ends may be treated to reduce friction and binding. The compressive force is selected to allow sliding motion between the brackets to accommodate differential thermal growth reducing the opportunity for low cycle fatigue of the manifold. Spring loading maintains the compressive force and also dampens vibrations transmitted to the bracket thus reducing alternating stress in the manifold.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
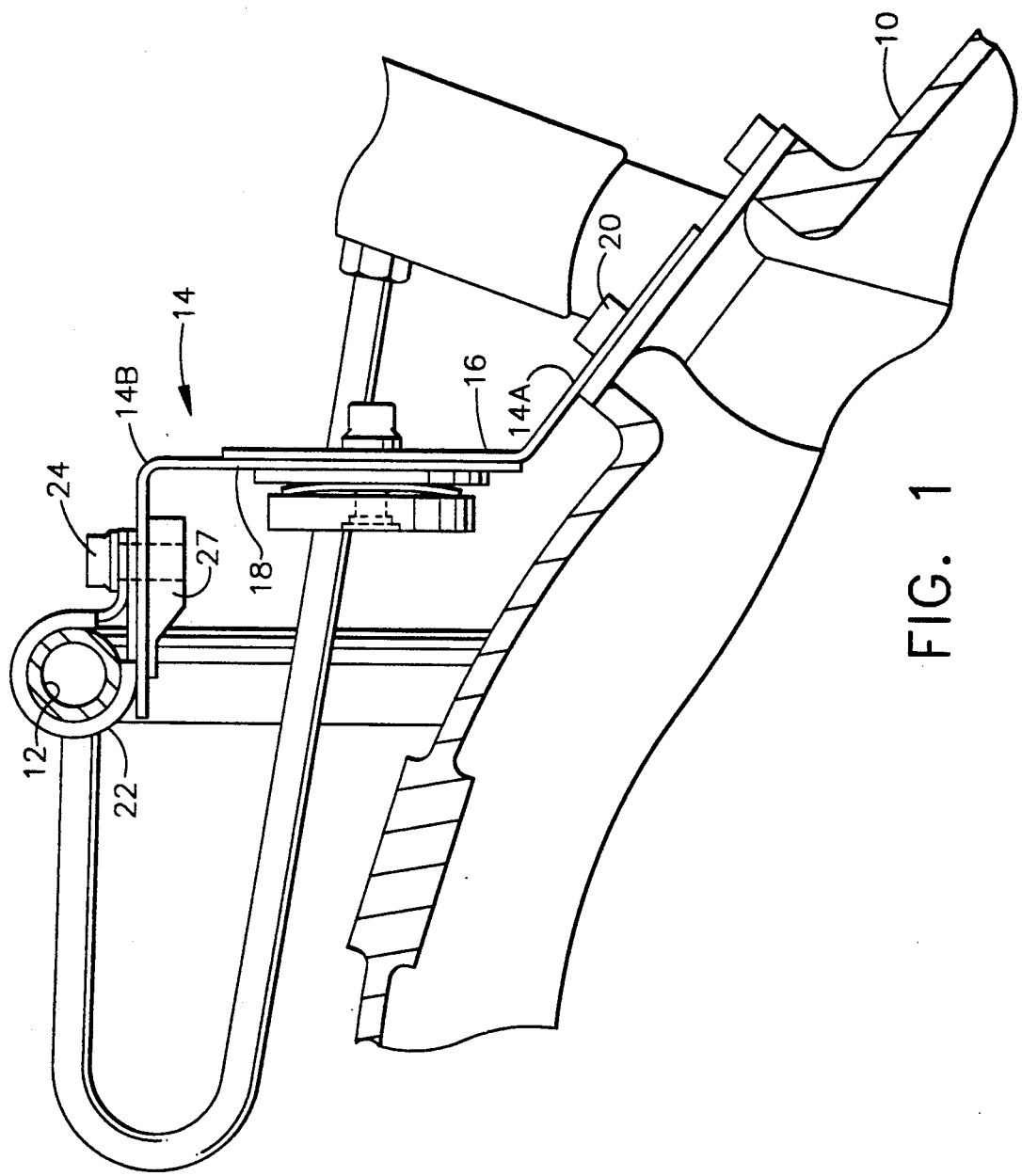
FIG. 1 is a simplified, partial sectional view of a combustor section of a gas turbine engine showing attachment of a fuel manifold using one form of the present invention.

FIG. 1 is a simplified, partial cross-sectional drawing of a combustor 10 of a gas turbine engine illustrating one embodiment of- a method and apparatus for coupling a fuel manifold 12 to the combustor. An example of a fuel distribution system in a gas turbine engine with which the present invention may be used is shown in U.S. Pat. No. 3,775,975. The manifold 12 is supported by a bracket 14 comprising a first elongated bracket member 14A fixedly connected to combustor 10 and a second elongated bracket member 14B fixedly connected to manifold 12. Distal ends, i.e., the ends dispose from the fixed connection points, of each of the bracket members 14A and 14B are designated at 16 and 18, respectively, in overlapping contact. The opposite end of bracket member 14A is bolted to combustor 10 by bolt 20. The opposite end of bracket member 14B is bolted to manifold 12 using a conventional pipe clamp 22 and a bolt 24 which threadedly engages a nut assembly 27 riveted to bracket member 14B.

Figure 3:
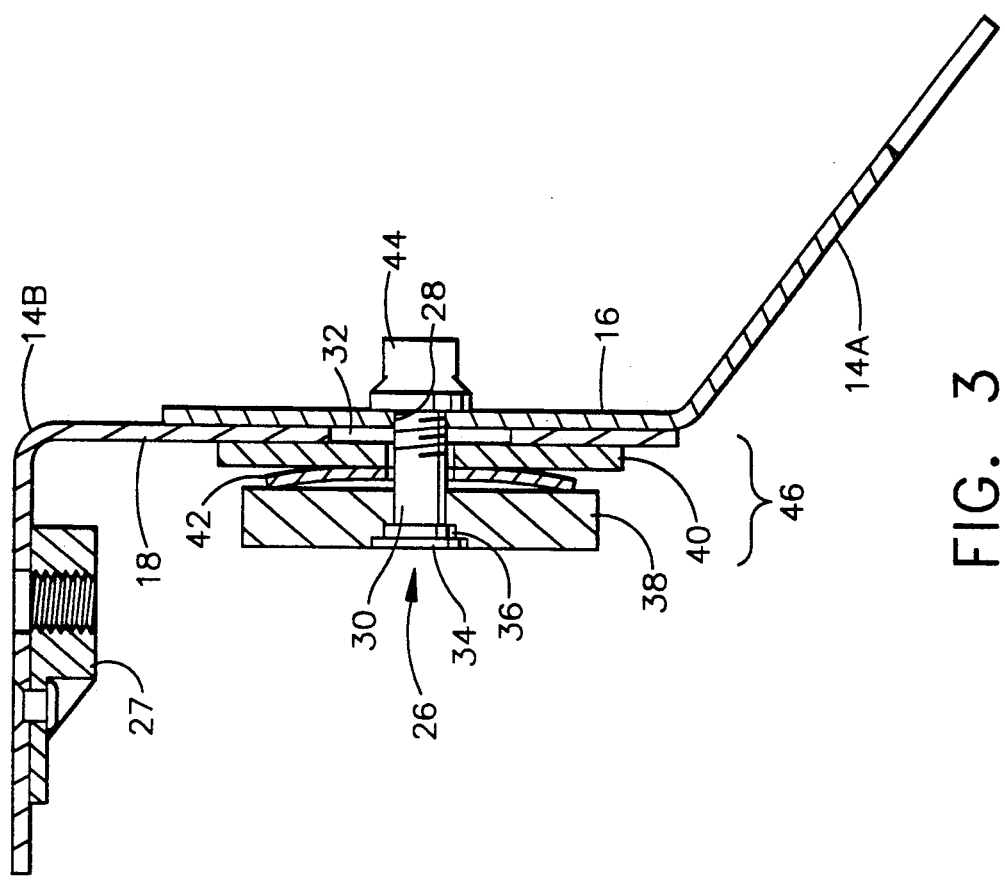
FIG. 3 is a cross-sectional view taken along lines 3—3 of FIG. 2.
Figure 2:
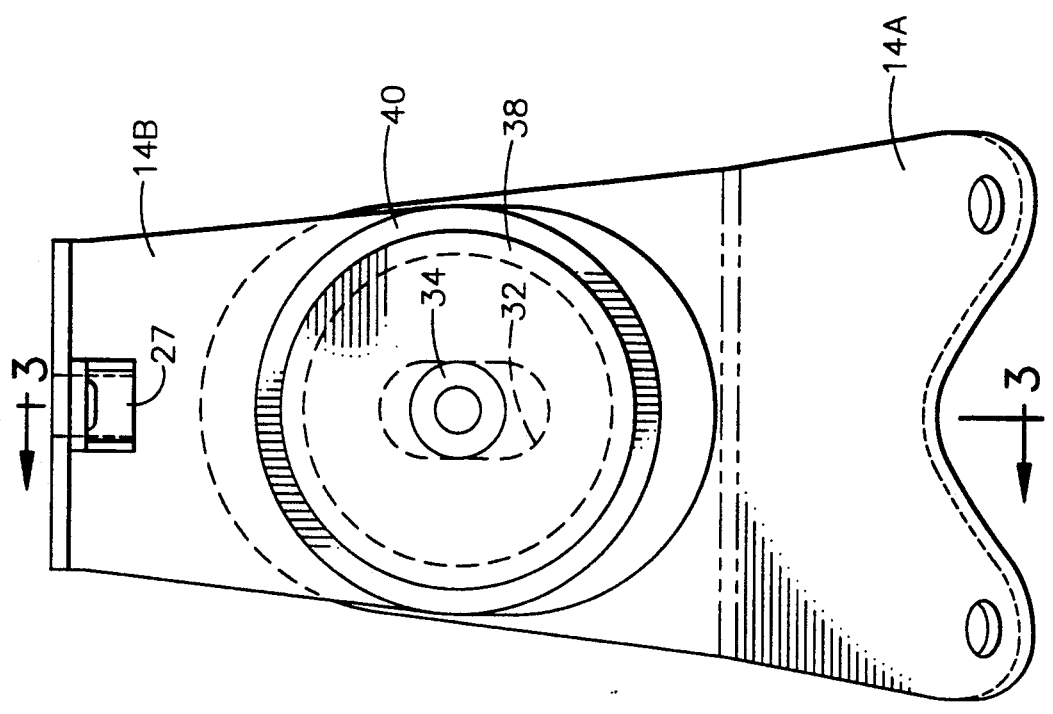
FIG. 2 is a bottom view of the attachment bracket of FIG. 1.

Considering FIG. 1 in conjunction with the bottom view of bracket 14 in FIG. 2 and the cross-sectional view in FIG. 3, it can be seen that the ends 16 and 18 are held in sliding engagement by a fastener 26. The end 16 has an aperture 28 with a diameter just sufficiently large to pass the shaft 30 of fastener 26. The end 18 has an elongated slot 32, generally aligned with aperture 28, through which shaft 30 passes. In a preferred form, fastener 26 comprises a threaded stud having a headed end 34 with a reduced diameter at 36 formed with a serrated edge similar to a PEM fastener. The fastener 26 is pressed or swaged into a first spring bearing member or relatively large diameter disk 38 such that the disk 38 and fastener 26 act as an integral unit. Other methods of attaching fastener 26 to disk 38 could be used as well as machining or casting the disk and fastener as an integral unit. For purposes which will become apparent, it is important that the fastener and disk act integrally in this embodiment.

A second spring bearing member or annular disk 40, which may comprise a large, relatively stiff, flat washer, is also positioned on shaft 30 and abuts a surface of bracket member 14B. A spring member 42, preferably in the form of one or more Belleville washers, is positioned on shaft 30 between disk 38 and disk 40. The disks 38 and 40 both are annular and having outer diameters which are larger than the outer diameter of spring member 42 so that the spring member is fully captured between the disks. A nut 44 threadedly engages the end of shaft 30 protruding through bracket ends 16 and 18 and compresses the ends against the force of spring member 42. Functionally, the spring member 42 and disks 38 and 40 comprise a spring assembly 46 for maintaining a uniform pressure on the ends 16, 18.

In operation, the nut 44 has been torqued to establish a preselected compressive force on the overlapping bracket ends 16 and 18. The compressive force is selected to allow a sliding motion between the bracket ends without allowing the ends to separate. It is desirable to treat the abutting surfaces of ends 16 and 18 to facilitate sliding and prevent wear such as, for example, by coating the surfaces with a material such as Teflon or tungsten-carbide. Both surfaces of end 16 may be coated since it also moves on disk 40. Expansion of the combustor 10 towards the manifold 12 is absorbed by motion of bracket end 16 with respect to bracket end 18. Further, the additional mass added to the bracket 14 by the fastener 26 and the spring assembly coupled with the action of spring member 42 acts to impede transmission of vibration through bracket 14, i.e., the bracket 14 is a stiff support which raises the manifold dynamic response above the normal engine excitation frequency thus improving dynamic stability.

As mentioned above, it is believed important to make the disk 38 integral with the headed end of fastener 26. If the disk 38 is merely positioned on shaft 30 in the manner of disk 40, it is possible for fastener 26 to pivot and allow the disk 38 to be oriented angularly with respect to the bracket end 16. This may result in transferring the loading of spring member 42 to an edge of disk 40 which may tend to bind against bracket end 16. Such binding would inhibit the sliding motion between ends 16 and 18 and defeat the function of the spring loaded joint. With the disk 38 being integral with fastener 26, disk 38 is held in a fixed perpendicular relationship to fastener 26. However, the spring member 42 allows some pivoting motion of bracket 14B with respect to bracket 14A for damping oscillations and compensating for any distortion of the bracket sections. It may also be desirable to form fastener 26 with an enlarged diameter shank and reduced diameter threaded portion so that a shoulder is formed at the juncture of the shank and threaded portions. The shoulder can then be seated against the lower surface of end 16 to establish a preselected spacing between disk 38 and end 16 so as to compress spring member 42 to a predetermined value. Nut 44 can then be tightened on fastener 26 without undue concern for a precise compressive force on spring member 42.

Figure 4:
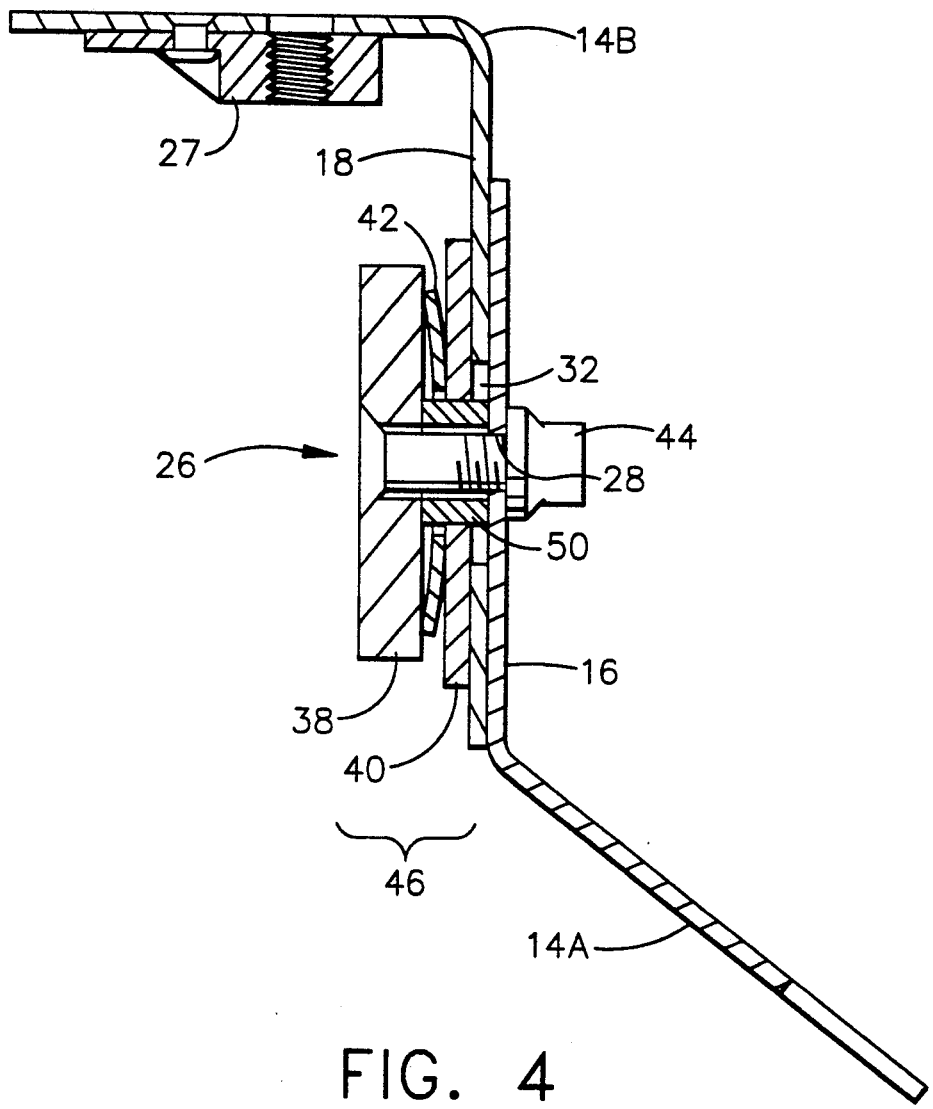
FIG. 4 is a cross-sectional view corresponding to FIG. 3 showing another embodiment of the invention.

Another embodiment of the invention is shown in FIG. 4 in which the compressive force exerted on the spring member 42 is controlled by setting the physical length of a sleeve member 50. In this embodiment, the sleeve member 50 extends between the disk 38 and the end 16 of the upper bracket member 14A. The sleeve member 50 may be a separate element or may be formed integrally with disk 38. Since the thickness of the intervening elements, i.e., end 18 of bracket member 14B and disk 40, are fixed known values, the length of sleeve member 50 can be selected to establish a selected clearance between disks 38 and 40 when the sleeve member 50 is compressed between end 16 and disk 38. The selected clearance will place a predetermined compressive force on spring member 42, or at least a force within an acceptable range since the force generated by spring member 42 is proportional to the distance compressed from an uncompressed state.

The embodiment of FIG. 4 exhibits advantages over the embodiment of FIG. 3, namely that the sleeve member 50 eliminates the need to carefully control the torque of fastener 26 and further assures that the disk 38 is held parallel to bracket end 16 without having to swage the fastener 26 into disk 38. Fastener 26 can therefore be a common flat-head fastener rather than the PEM type fastener of FIG. 3. Further, the spring member 42 may be of various types of springs, such as the aforementioned Belleville washer, but may be a simple wave-type spring.

As with the embodiment of FIG. 3, it is desirable to treat the abutting surfaces of ends 16 and 18 to facilitate sliding and to minimize wear. The surfaces may be coated with materials such as Teflon or tungsten-carbide. Both surfaces of end 18 may be coated along with disk 40 since end 16 slides on disk 40. Note also that the diameter of the aperture through disk 40 is controlled to be about the outside diameter of sleeve member 50 so as to minimize any sliding motion between disk 40 and spring member 42. The friction force established by spring member 42 coupled with the relative motion between ends 16 and 18 dampens the level of vibration transmitted through the bracket from the combustor case 10 to the fuel manifold 12. The spring member compressed gap is sized to prevent binding of bracket 14B and 14A during adverse deflections and distortions.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. Apparatus for supporting a relatively cool fuel manifold to a relatively hot combustor in a gas turbine engine, comprising;
    a first bracket member having a first end fixedly attached to a housing of the combustor and a second end extending toward the fuel manifold;
    a second bracket member having a first end attached to the fuel manifold and a second end extending toward said first member and overlapping said second end thereof;

an elongated slot formed in one of said first and second bracket members and extending in a direction form the manifold towards the combustor;

an aperture formed in another of said first and second bracket members aligned generally with said slot;

a fastener extending through said aperture and slot for slidingly coupling said first bracket member to said second bracket member; and a spring assembly positioned on said fastener for compressing said first bracket member against said second bracket member with a predetermined compressive force by way of a compression spring integral to said spring assembly, said compressive force being selected to maintain sliding engagement between said first and second bracket members and to allow limited sliding motion therebetween for reducing stress on the manifold form differential thermal growth, said spring assembly comprises a first bearing member fixedly attached to said fastener and a second bearing member positioned between said first bearing member and adjacent one of said first and second bracket members, with said compression spring positioned for reacting between said first and second bearing members.

2. The apparatus of claim 1 and including a sleeve fitting around said fastener and extending between said spring bearing member and said one of said first and second bracket members having an aperture formed therein.

3. The apparatus of claim 2 wherein said sleeve is formed integrally with said spring bearing member.

4. The apparatus of claim 1 wherein said compression spring comprises a Belleville washer.

5. The apparatus of claim 1 wherein said first bearing member comprises an annular metal disc, one end of said fastener being fixedly attached to said disc.

6. The apparatus of claim 1 wherein said fastener comprises a threaded stud having a head on one end, said first bearing member having a central aperture adapted for allowing said fastener head to be swaged thereinto.

7. The apparatus of claim 6 and including a nut threadingly engaging another end of said fastener for establishing said predetermined compressive force between said first and second bracket members.

8. The apparatus of claim 7 wherein said first and second bearing members each have a diameter greater than the diameter of said compression spring.

9. The apparatus of claim 8 wherein abutting surfaces of said first and second bracket members are each treated for reducing friction therebetween.

10. Apparatus for supporting a relatively cool fuel manifold to a relatively hot combustor in a gas turbine engine, comprising:

a first bracket member having a first end fixedly attached to a housing of the combustor and a second end extending toward the fuel manifold;

a second bracket member having a first end attached to the fuel manifold and a second end extending toward said first member and overlapping said second end thereof;

an elongated slot formed in one of said first and second bracket members and extending in a direction from the manifold towards the combustor;

an aperture formed in another of said first and second bracket members aligned generally with said slot;

a fastener extending through said aperture and slot for slidingly coupling said first bracket member to said second bracket member;

a spring assembly positioned on said fastener for compressing said first bracket member against said second bracket member with a predetermined compressive force, said compressive force being selected to maintain sliding engagement between said first and second bracket members and to allow limited sliding motion therebetween for reducing stress on the manifold from differential thermal growth, said spring assembly including a first spring bearing member disposed about one end of said fastener; and a sleeve fitting around said fastener and extending between said first spring bearing member and said one of said first and second bracket members having an aperture formed therein for establishing a preselected spacing between said bearing member and said one of said bracket members.

11. The apparatus of claim 10 wherein said spring assembly comprises the first bearing member fixedly attached to said fastener and a second bearing member positioned between said first bearing member and an adjacent one of said first and second bracket members, and a compression spring positioned for reacting between said first and second bearing members.

12. The apparatus of claim 11 wherein said sleeve passes through apertures in each of said spring and said second bearing member, said aperture in said second bearing member being selected to minimize sliding motion of said second bearing member.

13. The apparatus of claim 12 wherein said sleeve is formed integrally with said first bearing member.

14. The apparatus of claim 10 wherein said spring assembly comprises a wave-type spring.

* * * * *